United States Patent [19]
Nief

[11] Patent Number: 5,709,283
[45] Date of Patent: Jan. 20, 1998

[54] METHOD AND APPARATUS FOR A HYDRAULIC SEAL RETAINER FOR A RACK AND PINION STEERING GEAR

[75] Inventor: Glenn G. Nief, Loudon, Tenn.

[73] Assignee: TRW Inc., Lyndhurst, Ohio

[21] Appl. No.: 571,088

[22] Filed: Dec. 12, 1995

[51] Int. Cl.$^6$ .................................................. B62D 5/22
[52] U.S. Cl. ........................................ 180/428; 277/188 R
[58] Field of Search ................................. 180/400, 427, 180/428; 277/188 R, 188 A, 205

[56] References Cited

U.S. PATENT DOCUMENTS

| | | | |
|---|---|---|---|
| 3,075,779 | 1/1963 | Holdham | 277/37 |
| 4,123,965 | 11/1978 | Brown et al. | 180/428 X |
| 4,369,852 | 1/1983 | Nishikawa et al. | 180/428 |
| 4,373,599 | 2/1983 | Walter et al. | 277/188 R X |
| 4,544,168 | 10/1985 | Hans et al. | 277/84 |
| 4,828,068 | 5/1989 | Wendler et al. | 180/428 |
| 5,091,142 | 2/1992 | Petit | 376/261 |
| 5,181,581 | 1/1993 | Engler | 180/428 |
| 5,213,175 | 5/1993 | Feindel | 180/428 |

*Primary Examiner*—Kevin Hurley
*Attorney, Agent, or Firm*—Tarolli, Sundheim, Covell, Tummino & Szabo

[57] ABSTRACT

A hydraulic rack and pinion power steering gear (10) and a method of assembling the steering gear (10) are provided comprising a rack (20) operatively associated with steerable vehicle wheels. The rack (20) is movable in opposite directions for turning the steerable wheels in opposite directions. A pinion (18) is in meshing engagement with the rack (20), and a housing (16) partially encloses the rack (20) and defines a fluid chamber (24). Sealing means (62, 70) is provided between the housing (16) and the rack (20), and a seal retainer (72) is provided for holding the sealing means (62, 70) in sealing position between the housing (16) and the rack (20). The seal retainer (22) comprises a first portion (74) for engaging and axially supporting the sealing means (62, 70) and encircling the rack (20), and a second portion (76) integral with the first portion (74) and which deflects radially inward as the seal retainer (72) is positioned in the housing (16). The second portion (76), upon axial movement into the housing (16), snaps radially outward into an internal recess (36) in the housing (16) to hold the seal retainer (72) and the sealing means (62, 70) in the housing (16). The second portion (76) of the seal retainer (72) comprises an annular plurality of deflectable tabs (90), the tabs (90) being cantilevered from the first portion (74) of the seal retainer (72). The apparatus further includes a removal tool (116) for removing the seal retainer (72) from the housing (16). The removal tool (116) has means (122) for deflecting the second portion (76) of the seal retainer (72) radially inward such that the second annular portion (76) disengages from the internal recess (36) in the housing (16).

21 Claims, 4 Drawing Sheets

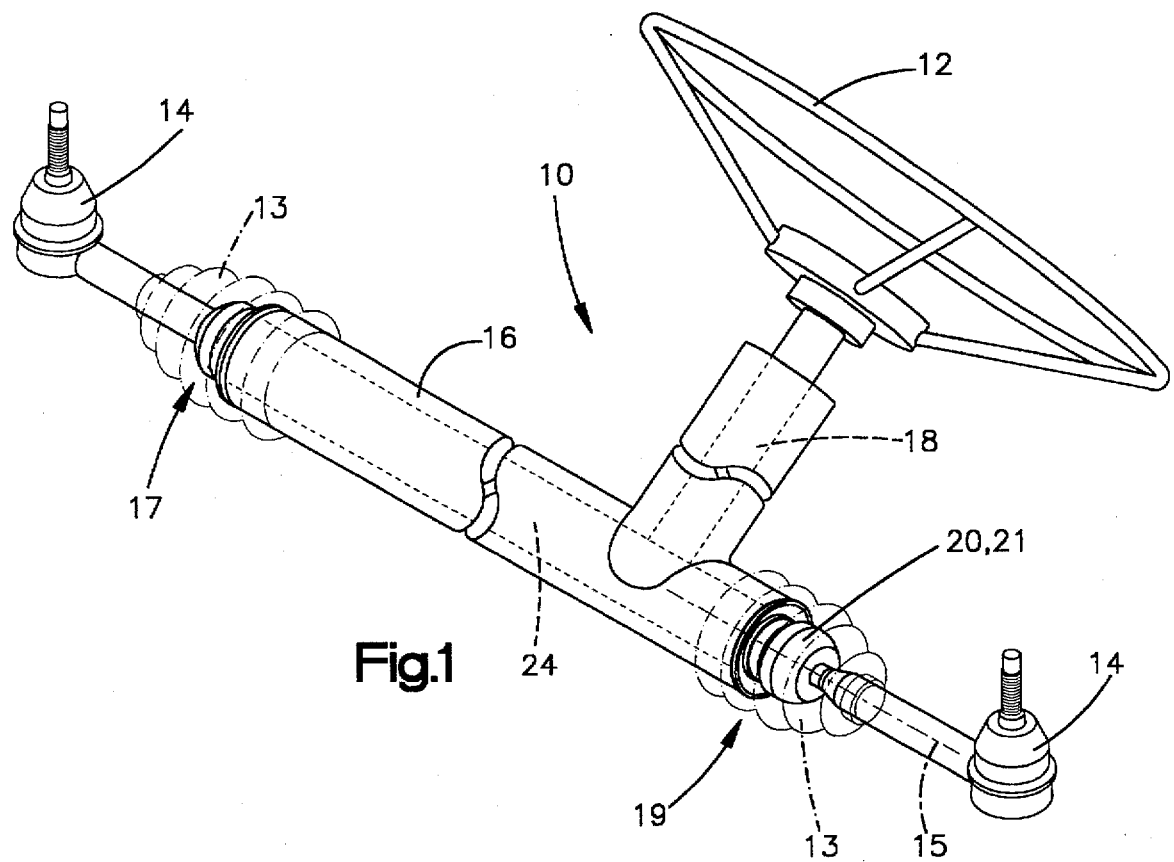
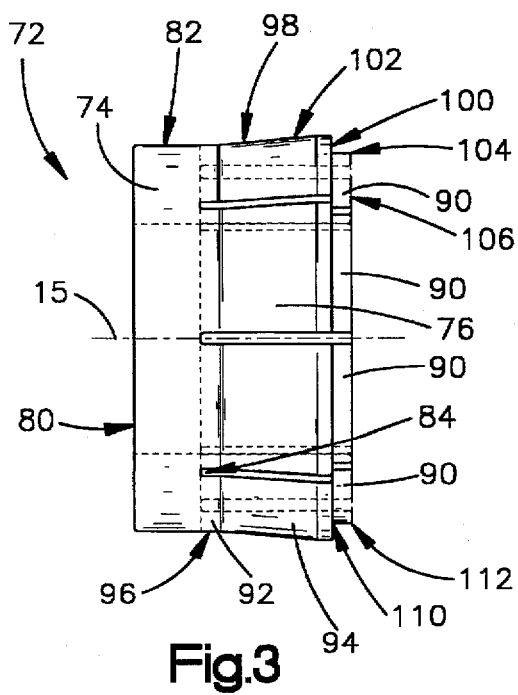
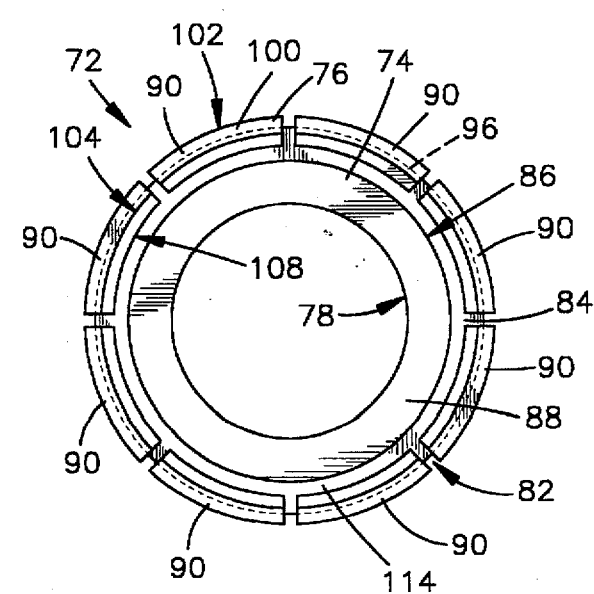

METHOD AND APPARATUS FOR A HYDRAULIC SEAL RETAINER FOR A RACK AND PINION STEERING GEAR

FIELD OF THE INVENTION

The present invention is directed to a hydraulic rack and pinion power steering gear and a method of assembling the steering gear.

BACKGROUND OF THE INVENTION

A hydraulic rack and pinion power steering gear for a vehicle commonly includes a rack which extends axially through a chamber inside a hydraulic cylinder. The ends of the rack are connected with steering linkage which is connected to the steerable wheels of the vehicle. A piston is fixed to the rack within the chamber. Rotation of the vehicle steering wheel actuates a hydraulic valve and causes hydraulic fluid under pressure to act against the piston. The force exerted by the hydraulic fluid moves the piston within the chamber and moves the rack axially. Axial movement of the rack moves the steering linkage to turn the steerable wheels of the vehicle.

To prevent hydraulic fluid from flowing out of the chamber, it is necessary to seal the chamber. It is also necessary to have a means for retaining the seal or seals in their positions. Various combinations of seals and seal retainers have been employed for performing these functions.

A current design for retaining a hydraulic seal in a hydraulic cylinder is a wrapped wire design. The wire is inserted through an annular slot in the hydraulic cylinder and then into a hole in a seal retainer or a bushing. The seal retainer is then rotated to allow the wire to simultaneously engage an annular groove in the seal retainer and the annular slot in the hydraulic cylinder. Machining these slots is time consuming and labor intensive. Also, the slot in the hydraulic cylinder may have sharp edges which can tear the sealing beads of the bellows which are used to keep foreign material out of the ends of the hydraulic cylinder. Further, the slot in the hydraulic cylinder must itself be sealed in some manner. Assembly of the wrapped wire design is also labor intensive as the wire, the slot in the cylinder, and the hole in the seal retainer must be visually lined up. Finally, the turning motion used to install the wire is manually cumbersome.

SUMMARY OF THE INVENTION

In accordance with the present invention an apparatus comprises a rack operatively associated with steerable vehicle wheels. The rack is movable in opposite directions for turning the steerable wheels in opposite directions. A pinion is in meshing engagement with the rack, and a housing partially encloses the rack and defines a fluid chamber. Sealing means is provided between the housing and the rack, and a seal retainer is provided for holding the sealing means in sealing position between the housing and the rack. The seal retainer comprises a first portion for engaging and axially supporting the sealing means and encircling the rack, and a second portion integral with the first portion and which deflects radially inward as the seal retainer is positioned in the housing. The second portion, upon axial movement into the housing, snaps radially outward into an internal recess in the housing to hold the seal retainer and the sealing means in the housing.

The housing is tubular and has an inner surface defining an inside diameter, an outer surface defining an outside diameter, and an open end. The internal recess in the housing is located in the inner surface near the open end. The apparatus further comprises an annular bushing located between the rack and the housing. The annular bushing supports the rack for axial movement inside the housing and supports the sealing means between the housing and the rack. The sealing means comprises a first seal member located between the housing and the annular bushing and a second seal member located between the annular bushing and the rack.

In accordance with a principal feature of the invention, the second portion of the seal retainer comprises an annular plurality of deflectable tabs. The tabs are cantilevered from the first portion of the seal retainer and snap into the internal recess in the housing.

In accordance another feature of the invention, the apparatus further includes a removal tool for removing the seal retainer from the housing. The removal tool has means for deflecting the second portion of the seal retainer radially inward such that the second annular portion disengages from the internal recess in the housing.

In accordance with yet another feature of the invention, a method comprises the steps of providing a rack operatively associated with steerable vehicle wheels. The rack is movable in opposite directions for turning the steerable wheels in opposite directions. A pinion is located in meshing engagement with the rack. A fluid seal is positioned between the tubular housing and the rack and a seal retainer is positioned in the housing to engage and support the fluid seal. A first portion of the seal retainer encircles the rack. A second portion of the seal retainer deflects radially inward as the seal retainer is positioned in the housing. The second portion of the seal retainer snaps radially outward into an internal recess in the housing to hold the seal retainer in the housing. The fluid seal is then held in sealing position between the tubular housing and the rack by the seal retainer.

The method may further involve the step of removing the seal retainer from the housing by sliding an annular removal tool onto the rack and moving the annular removal tool axially toward the seal retainer until a first end portion of the annular removal tool contacts the second portion of the seal retainer inside the housing and deflects the second portion of the seal retainer radially inward such that the second portion disengages from the internal recess in the housing. The seal retainer may then be removed from the housing.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a rack and pinion vehicle steering gear constructed in accordance with the present invention;

FIG. 3 is a side view of the seal retainer of FIG. 2 in accordance with the present invention;

FIG. 4 is an end view of the seal retainer shown in FIG. 3;

DESCRIPTION OF PREFERRED EMBODIMENT

Referring to FIG. 1, a rack and pinion steering gear 10 is operatively connected between a pair of steerable wheels (not shown) and a vehicle steering wheel 12. The rack and pinion steering gear 10 is connected to the pair of steerable wheels in a known manner by steering linkage 14 at both ends of the steering gear 10.

Figure 2:
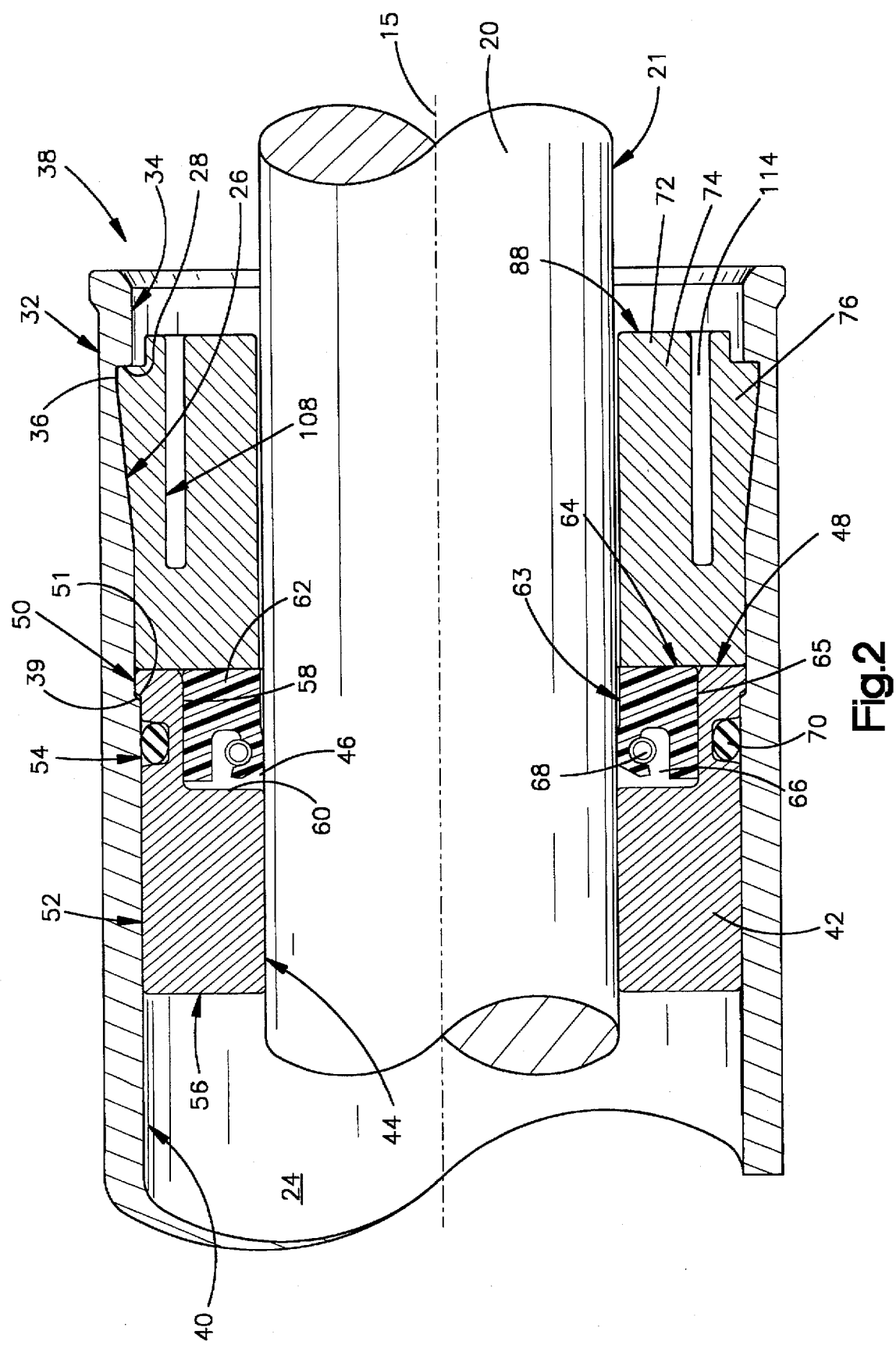
FIG. 2 is an enlarged sectional view of a portion of the rack and pinion steering gear of FIG. 1, showing a seal retainer in accordance with the present invention.

The rack and pinion steering gear 10 includes a housing 16, a pinion 18, and a rack 20. The rack 20 is cylindrical, has an outer surface 21, and is centered about an axis 15. The housing 16 is tubular and is also centered about the axis 15. The rack 20 extends axially through the housing 16 and is partially enclosed by the housing 16. Distal ends 17 and 19 of the rack 20 extend beyond the housing 16. The rack 20 is connected to the steering linkages 14 at the distal ends 17 and 19. The distal ends 17 and 19 where the rack 20 extends from the housing 16 are enclosed by bellows 13 which are made of a suitable flexible material, such as rubber. The pinion 18 is in meshing engagement with the rack 20 inside the housing 16. The housing 16 defines a fluid chamber 24 between the rack 20 and the housing 16, as shown in FIG. 2. A piston (not shown) is fixed to the rack 20 inside the fluid chamber 24. As is known in the art, upon rotation of the vehicle steering wheel 12, hydraulic fluid under pressure in the chamber 24 acts against the piston, causing the rack 20 to move axially within the housing 16. Axial movement of the rack 20 in opposite directions moves the steering linkages 14 connected to the rack 20 and thus turns the steerable wheels in opposite directions.

Referring now to FIG. 2, the tubular housing 16 includes an open end 38, an outer surface 32, a first inner surface 34, an internal recess 36, and a second inner surface 40. The first inner surface 34 defines a first inside diameter for the housing 16, and the second inner surface 40 defines a second inside diameter for the housing 16. The first inside diameter for the housing 16 is greater than the second inside diameter. A tapered step 39 connects the first inner surface 34 with the second inner surface 40.

The internal recess 36 in the housing 16 is located in the first inner surface 34 of the housing 16 near the open end 38. The internal recess 36 has a first surface portion 26 which is tapered inward from the first inner surface 34 and a second surface portion 28 which is radially oriented. The outer surface 32 of the housing 16 defines an outside diameter for the housing 16. The outer surface 32 is continuous and does not contain any radial holes or slots.

An annular bushing 42 is located between the rack 20 and the housing 16. The annular bushing 42 is centered about the axis 15. The annular bushing 42 supports the rack 20 for axial movement within the housing 16. The annular bushing 42 has a cylindrical inner surface 44, a first recess 46, a first radial surface 48, a first outer surface portion 50, a second outer surface portion 52, a second recess 54, and a second radial surface 56. The cylindrical inner surface 44 is in sliding engagement with the outer surface 21 of the rack 20. The first radial surface 48 faces the open end 38 of the housing 16. The first recess 46 is located in the first radial surface 48 and has a radial surface portion 58 and an axial surface portion 60.

The first outer surface portion 50 of the annular bushing 42 intersects with the first radial surface 48. The second outer surface portion 52 intersects with the second radial surface 56. The second radial surface 56 faces the chamber 24 inside the housing 16. The first outer surface portion 50 defines a first outside diameter for the annular bushing 42, and the second outer surface portion 52 defines a second outside diameter. The first outside diameter of the annular bushing 42 is greater than the second outside diameter. A tapered step 51 connects the first outer surface portion 50 with the second outer surface portion 52. The first and second outside diameters of the annular bushing 42 are substantially equal to the first and second inside diameters, respectively, of the housing 16. The second recess 54 is located in the second outer surface portion 52.

A first fluid seal 62 is located in the first recess 46 of the annular bushing 42 to seal the intersection of the rack 20 and the annular bushing 42. The first fluid seal 62 is U-shaped and has a first surface portion 63, a second surface portion 64, a third surface portion 65, and a cavity 66. The first surface portion 63 of the first fluid seal 62 engages the rack 20. The third surface portion 65 engages the axial surface portion 60 of the first recess 46 in the annular bushing 42. The second surface portion 64 faces outward towards the open end 38 of the housing 16 and is flush with the first radial surface 48 of the annular bushing 42. The cavity 66 opens towards the radial surface portion 58 of the first recess 46. A circular garter spring 68 is located in the cavity 66 in the seal 66 and compresses the first fluid seal 62 radially inward around the rack 20. The first fluid seal 62 is commercially available with the garter spring 68 in place.

A second fluid seal 70 is located in the second recess 54 of the annular bushing 42 to seal the intersection of the annular bushing 42 and the second inner surface 40 of the housing 16. The second fluid seal 70 is a commercially available O-ring.

An annular seal retainer 72 is located between the annular bushing 42 and the open end 38 of the housing 16. The retainer 72 is centered about the axis 15. The seal retainer 72 is preferably made from a plastic resin, but may also be made from metal or a composite material. The seal retainer 72 comprises a first portion 74 and a second portion 76 which is integral with the first portion 74. Referring now to FIGS. 3 and 4, the first portion 74 has an inner surface 78, a first radial surface 80, an outer surface 82, a second radial surface 84, an axial surface 86, and a third radial surface 88. The inner surface 78 encircles and is in sliding engagement with the outer surface 21 of the rack 20, as shown in FIG. 2. The first radial surface 80 extends from the inner surface 78 to the outer surface 82. When installed into the housing 16, the first radial surface 80 of the seal retainer 72 abuts the annular bushing 42 and the first fluid seal 62 contained therein. The outer surface 82 defines an outside diameter for the first portion 74 which is substantially equal to the first inside diameter of the housing 16. The second radial surface 84 extends from the outer surface 82 to the axial surface 86. The axial surface 86 connects the second radial surface 84 with the third radial surface 88. When installed in the housing 16, the third radial surface 88 of the seal retainer faces the open end 38 of the housing 16, as may be seen in FIG. 2.

The second portion 76 of the seal retainer 72 extends integrally from the second radial surface 84 of the first portion 74. As shown in FIGS. 3 and 4, the second portion 76 comprises an annular plurality of deflectable tabs 90. The annular plurality of deflectable tabs 90 extend axially outward in cantilevered fashion from the second radial surface 84 of the first portion 74. Each deflectable tab 90 has a bending portion 92 which is integral with a contact portion 94. The bending portion 92 of each deflectable tab 90 is located at the end of each deflectable tab 90 where the tab 90 extends from the first portion 74. The contact portion 94 of each deflectable tab 90 is located at the other end of each deflectable tab 90. The bending portion 92 of each deflectable tab has an outer surface 96 which is integrally flush with the outer surface 82 of the first portion 74.

The contact portion 94 of each deflectable tab 90 includes a first surface portion 98 which is tapered outward from the axial orientation of the outer surface 96 of the bending portion 92, and a second surface portion 100 which is radially oriented. The first and second surface portions 98 and 100 of the contact portion 94 are interconnected by a first corner 102. The shape defined by the first and second surface portions 98 and 100 of the contact portion 94 is identical to the shape of the internal recess 36 in the housing 16, as defined by the first and second surfaces 26 and 28, respectively.

The contact portion 94 of each deflectable tab 90 further includes a third surface portion 104, a fourth surface portion 106, and fifth surface portion 108. The third surface portion 104 is axially oriented and has a diameter which is less than the first inside diameter defined by the first inner surface 34 of the housing 16. The third surface portion 104 is connected to the second surface portion 100 by a second corner 110. The fourth surface portion 106 is radially oriented and interconnects the third surface portion 104 with the fifth surface. portion 108. The fourth surface portion 106 is connected to the third surface portion 104 at a third corner 112. When the seal retainer 72 is installed in the housing 16, the fourth surface portion 106 faces outward towards the open end 38 of the housing 16.

The fifth surface portion 108 of each deflectable tab 90 is axially oriented and extends across the underside of both the contact portion 94 and the bending portion 92 of each deflectable tab 90, as may be seen in FIG. 2. The fifth surface portion 108 intersects with the second radial surface 84 of the first portion 74 of the seal retainer 72. The fifth surface portion 108 has a diameter which is greater than the diameter of the axial surface 86 of the first portion 74. This configuration creates a deflection cavity 114 in the seal retainer 72 in-between the first portion 74 and the annular plurality of deflectable tabs 90. The deflection cavity 114 is radially large enough to accommodate radially inward deflection of the annular plurality of deflectable tabs 90 such that the outer surfaces of the bending portion 92 and the contact portion 94 are below flush with the outer surface 82 of the first portion 74 of the seal retainer 72.

To assemble to the rack and pinion steering gear 10, the annular bushing 42 is inserted inside the housing 16 through the open end 38. The annular bushing 42 is located between the rack 20 and the housing 16. The annular bushing 42 supports the rack 20 for axial movement within the housing 16. The second outer surface portion 52 of the annular bushing 42 has a clearance fit with the second inner surface 40 of the housing 16. The first outer surface portion 50 of the annular bushing 42 has a clearance fit with the first inner surface 34 of the housing 16. The annular bushing 42 is moved axially inward from the open end 38 until the tapered step 51 of the bushing 42 seats against the matching tapered step 39 in the housing 42.

The first fluid seal 62 contained in the first recess 46 of the annular bushing 42 seals the intersection of the rack 20 and the annular bushing 42. The second fluid seal 70 located in the second recess 54 of the annular bushing 42 seals the intersection of the annular bushing 42 and the second inner surface 40 of the housing 16. Thus, the hydraulic fluid present in the chamber 24 is sealed in the chamber 24 by the seals 62 and 70 in the annular bushing 42.

The seal retainer 72 is coaxially received by the rack 20 and is inserted into the housing 16 through the open end 38. The outer surface 82 of the first portion 74 has a clearance fit with the first inner surface 34 of the housing 16. The annular plurality of deflectable tabs 90 which comprise the second portion 76 of the seal retainer 72 are deflected radially inward into the deflection cavity 114 by contact with the inner surface 34 of the housing 16. Specifically, the deflectable tabs 90 bend at the bending portion 92 to permit the deflection of the tabs 90. The seal retainer 72 is translated axially inward until the first radial surface 80 of the seal retainer 72 abuts the first radial surface 48 of the annular bushing 42 and the third surface portion 64 of the first fluid seal 62 contained in the bushing 42.

When the seal retainer 72 has been inserted far enough into the housing 16, the deflectable tabs 90, which had been deflected radially inward, snap radially outward into the internal recess 36 in the housing 16. The first surface portion 98 of the contact portion 94 engages the first surface 26 of the internal recess 36, and the second surface portion 100 of the contact portion 94 engages the second surface 28 of the internal recess 36. Thus, when assembled, the seal retainer 72 holds the annular bushing 42 and the fluid seals 62 and 70 in the axial position shown in FIG. 2. Further, the seal retainer 72 is able to hold the parts in this position despite an axially directed force imposed on the second radial surface 56 of the annular bushing 42 by the pressure of the hydraulic fluid in the chamber 24. The axially directed force on the bushing 42 is transmitted to the housing 16 through the direct contact of the bushing 42 with the seal retainer 72, and the seal retainer 72 with the housing 16 in the recess 36.

The rack and pinion steering gear 10 is free from any radial holes or slots in the outer surface 32 of the housing 16 which are present in snap ring or wire retention designs. Hence, there are no sharp slot edges in the housing 16 which can tear the bellows 13, and there are no radial apertures in the housing 16 which need to be independently sealed. The rack and pinion steering gear 10 can be assembled in an automated environment as there is no need to machine a slot in the housing 16 or to visually line up the slot with a hole in a seal retainer to install a snap ring or wire. Further, the assembly of the rack and pinion steering gear 10 eliminates the turning motion necessary to install a snap ring or wire which can lead to wrist injuries and carpal tunnel syndrome.

Figure 5:
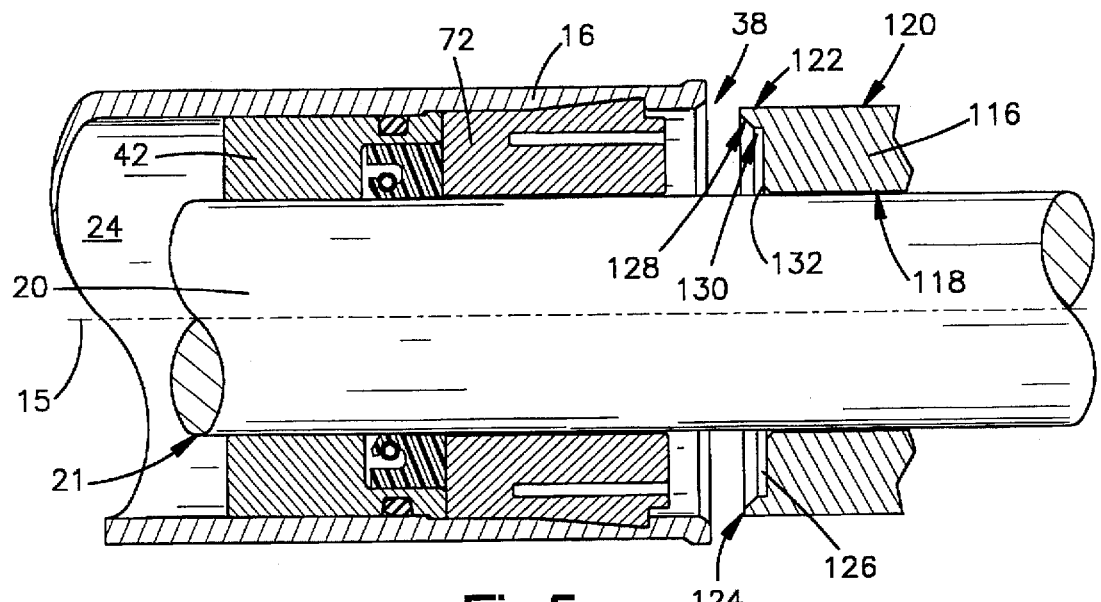
FIG. 5 is an enlarged sectional view similar to FIG. 2, showing a seal retainer removal tool in accordance with the present invention.

Referring now to FIG. 5, a removal tool 116 for removing the seal retainer 72 from the housing 16 is tubular in shape, having an inner surface 118 and an outer surface 120. The removal tool 116 is also centered about the axis 15. The inner surface 118 defines an inside diameter which permits sliding engagement with the outer surface 21 of the rack 20. The outer surface 120 defines an outside diameter which is less than the first inside diameter defined by the first inner surface 34 of the housing 16, but is greater than the diameter defined by the third surface portion 104 of each deflectable tab 90. The removal tool 116 further includes a first end portion 122 having a radial surface 124 and an annular cavity 126 which are interconnected by a chamfered surface portion 128. The annular cavity 126 has an axial surface 130 and a radial surface 132 which extends diametrically across the annular cavity 126. The radial surface 124 extends radially inward from the outer surface 120 of the removal tool 116 to the chamfered surface portion 128.

Figure 6:
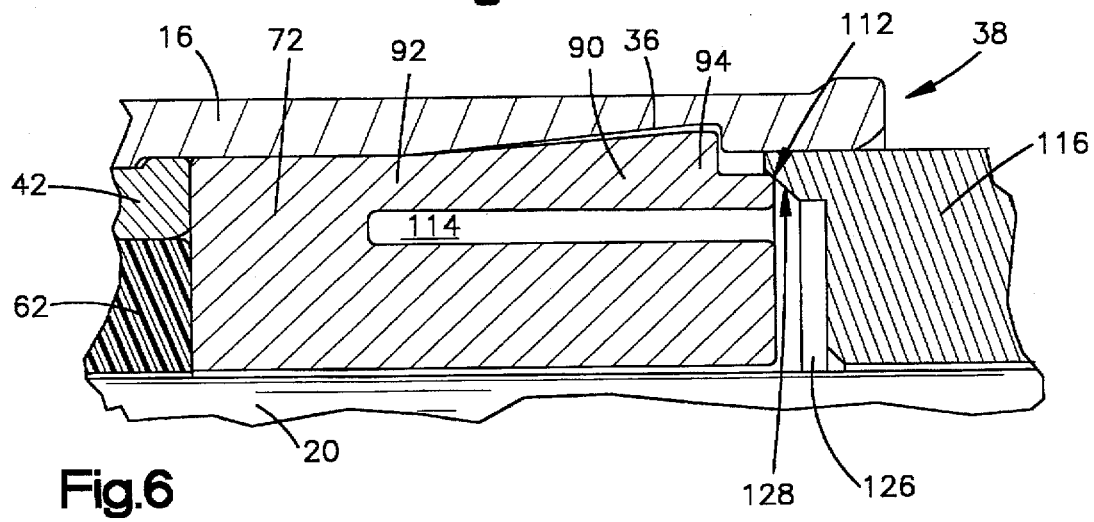
FIGS. 6–9 are enlarged partial views of FIG. 5 showing parts in different positions.
Figure 7:
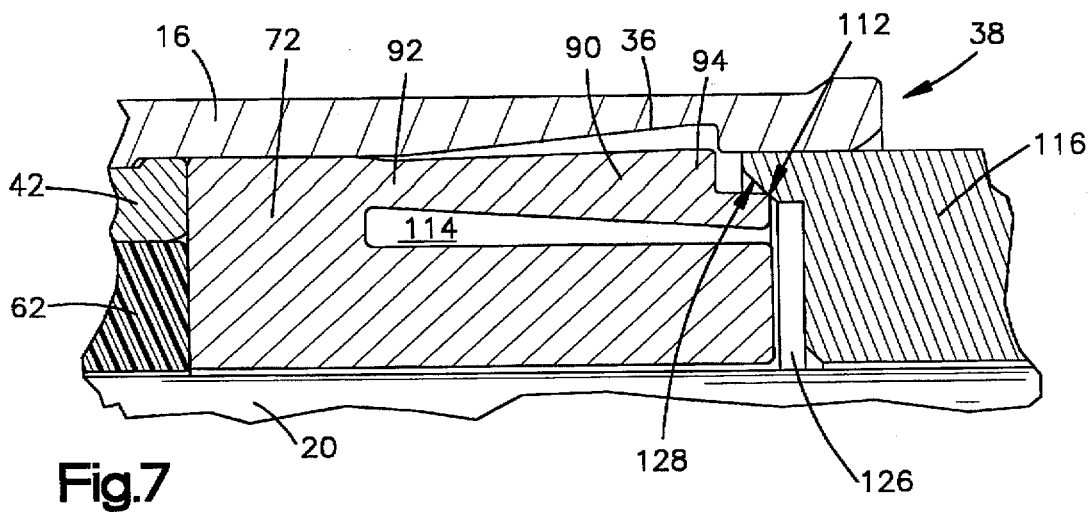

Disassembly of the rack and pinion steering gear 10 involves using the removal tool 116. As shown in FIG. 5, the removal tool 116 is coaxially received by the rack 20. The removal tool 116 is moved axially towards the seal retainer 72 on the rack 20 until the chamfered surface portion 128 in the first end portion 122 of the removal tool 116 contacts the third corner 112 of each of the deflectable tabs 90, as shown in FIG. 6. Referring now to FIGS. 6 and 7, continued axial movement of the removal tool 116 toward the seal retainer 72 causes the third corner 112 of each deflectable tab 90 to translate down the chamfered surface portion 128 of the removal tool 116, thereby deflecting the deflectable tabs 90 radially inward into the deflection cavity 114. The deflectable tabs 90 bend in the bending portion 92 just as the tabs 90 bend when the seal retainer 72 is installed through the open end 38 in the housing 16.

Figure 8:
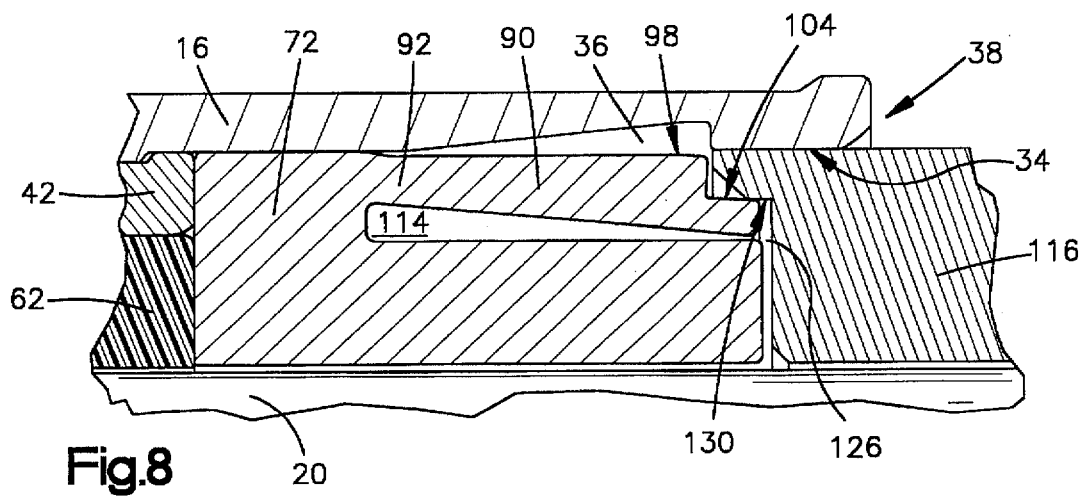
Figure 9:
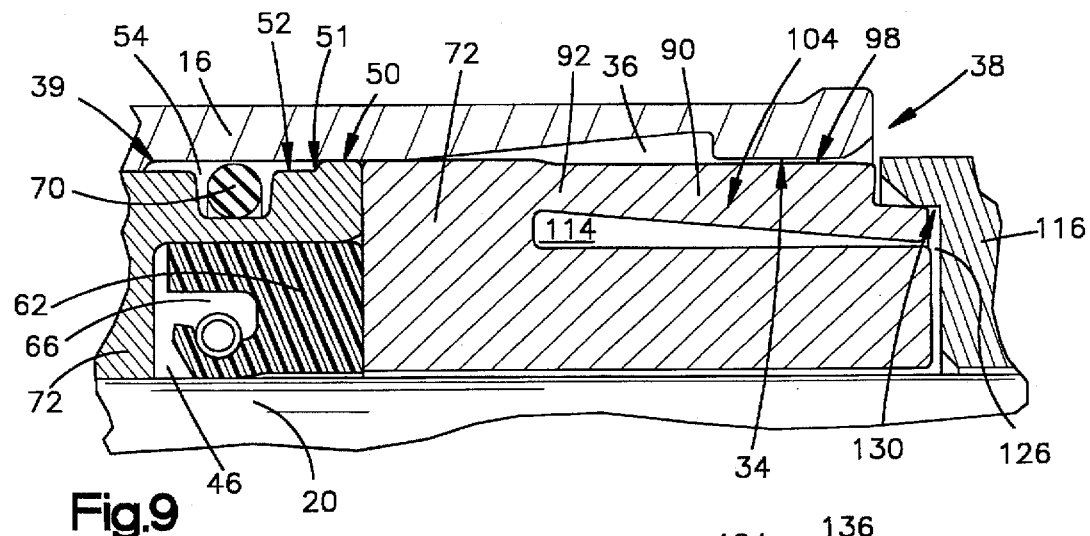
Figure 10:
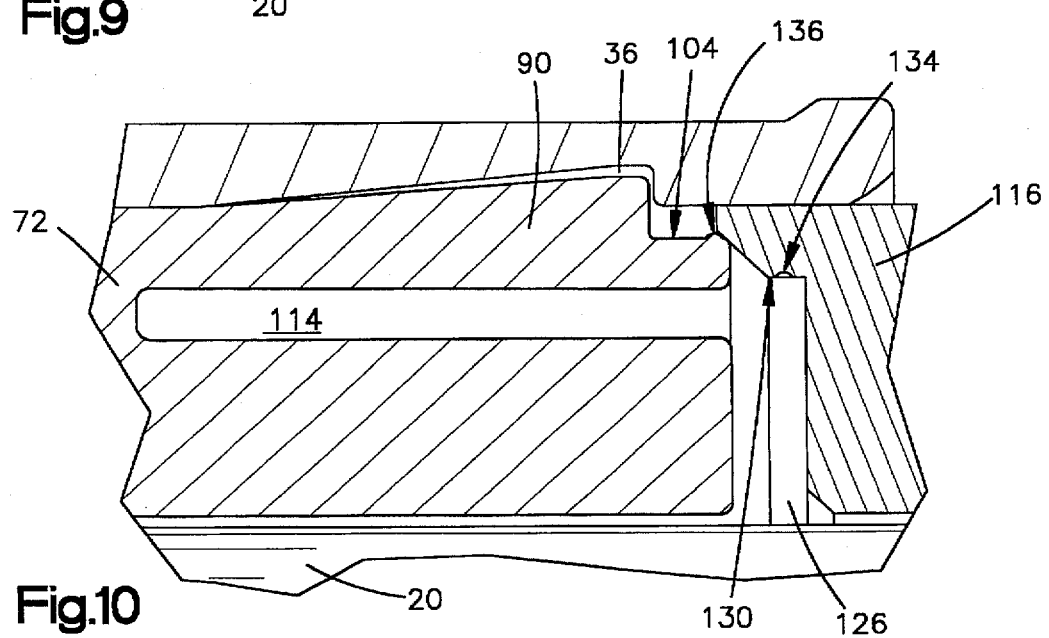
FIG. 10 is view similar to FIG. 6 showing an alternate embodiment of the present invention.

As the deflectable tabs 90 are deflected radially inward, the tabs 90 disengage from the internal recess 36 in the housing 16. As shown in FIG. 8, the removal tool 116 continues to move axially until each of the deflectable tabs 90 has deflected such that the third corner 112 of each tab 90 has slid from the chamfered surface portion 128 into the annular cavity 126 in the removal tool 116. The third surface 104 of each deflectable tab 90 is now in contact with the axial surface 130 of the cavity 126 in the removal tool 116. In this position, as can be seen in FIG. 8, the annular plurality of deflectable tabs 90 are completely disengaged from the internal recess 36 and the first surface portion 98 of the contact portion 94 has a diameter less than the inner surface 34 of the housing 16. Referring now to FIG. 9, the seal retainer 72 is no longer structurally held in place and can be slid axially on the rack 20 out from inside of the housing 16 through the open end 38. In an alternate embodiment of the present invention shown in FIG. 10, the seal retainer 72 and the removal tool 116 have structural features to accomplish the removal of the seal retainer 72 from inside the housing 16. An annular locking groove 134 is located in the axial surface 130 of the annular cavity 126 in the removal tool 116. The locking groove 134 is engaged by an annular locking bump 136 on the third surface portion 104 of each of the deflectable tabs 90 when the tabs 90 are moved into the cavity 126 during disassembly. When the locking bumps 136 are engaged in the locking groove 134, the seal retainer 72 can be removed from inside the housing 16 by pulling the removal tool 116 axially away from the housing 16.

From the above description of the invention, those skilled in the art will perceive improvements, changes and modifications. Such improvements, changes and modifications within the skill of the art to which the present invention relates are intended to be covered by the appended claims.

Having described the invention, the following is claimed:

1. An apparatus comprising:
   a rack operatively associated with steerable vehicle wheels, said rack being movable in opposite directions for turning said steerable wheels in opposite directions;
   a pinion in meshing engagement with said rack;
   a housing partially enclosing said rack and defining a fluid chamber, said housing having an internal recess;
   a sealing means between said housing and said rack; and
   a seal retainer for holding said sealing means in sealing position between said housing and said rack, said seal retainer comprising;
   a first portion for engaging and axially supporting said sealing means and encircling said rack; and
   a second portion integral with said first portion and which deflects radially inward as said seal retainer is positioned in said housing, said second portion snapping radially outward into said internal recess in said housing to hold said seal retainer and said sealing means in said housing.

2. The apparatus as defined in claim 1 wherein said housing is tubular and has an inner surface defining an inside diameter, an outer surface defining an outside diameter, and an open end, said internal recess in said housing being located in said inner surface near said open end.

3. The apparatus as defined in claim 2 wherein said outer surface of said housing is continuous and free from radial holes or slots.

4. The apparatus as defined in claim 1 wherein said apparatus further comprises an annular bushing located between said rack and said housing, said annular bushing supporting said rack for axial movement inside said housing and supporting said sealing means between said housing and said rack.

5. The apparatus as defined in claim 4 wherein said sealing means comprises a first seal member located between said housing and said annular bushing and a second seal member located between said annular bushing and said rack.

6. The apparatus as defined in claim 1 wherein said second portion of said seal retainer comprises an annular plurality of deflectable tabs, said tabs being cantilevered from said first portion of said seal retainer.

7. The apparatus as defined in claim 6 wherein said each of said deflectable tabs has a bending portion and a contact portion, said bending portion being located at an end of each of said deflectable tabs nearest said first portion of said seal retainer, said contact portion being located at another end of each of said deflectable tabs.

8. The apparatus as defined in claim 7 wherein said contact portion of each of said deflectable tabs includes a first surface portion which tapers outwardly in an axial direction away from said from said bending portion, and a second surface portion which is radially oriented, said first and second surface portions being interconnected by a first corner.

9. The apparatus as defined in claim 8 wherein said internal recess in said inner surface of said housing has a complimentary shape to that defined by said first and second surface portions of said contact portions of each of said annular plurality of deflectable tabs.

10. The apparatus as defined in claim 8 wherein, as said seal retainer is positioned in said housing, said first surface portion, said first corner, and said second surface portion of each of said annular plurality of deflectable tabs are received in said internal recess in said housing.

11. The apparatus as defined in claim 2 wherein said apparatus further includes a removal tool for removing said seal retainer from said housing, said removal tool having means for deflecting said second portion of said seal retainer radially inward such that said second annular portion disengages from said internal recess in said housing.

12. The apparatus as defined in claim 11 wherein said removal tool is tubular and has an inner surface defining a inside diameter and an outer surface defining an outside diameter, said outside diameter being less than said inside diameter of said housing.

13. The apparatus as defined in claim 12 wherein, for removal of said seal retainer from said housing, said removal tool slides coaxially onto said rack and fits inside of said housing through said open end in said housing.

14. The apparatus as defined in claim 12 wherein said removal tool includes a first end portion having surface means which define a chamfered portion and an annular cavity.

15. The apparatus as defined in claim 14 wherein, for removal of said seal retainer from said housing, said removal tool is moved axially onto said rack whereupon said chamfered portion of said removal tool engages said contact portion of each of said deflectable tabs and deflects said tabs radially inward such that said contact portion of each of said deflectable tabs disengage from said internal recess in said housing.

16. The apparatus as defined in claim 15 wherein, upon disengagement of said deflectable tabs from said housing, fluid pressure in said housing pushes said seal retainer and said sealing means out of said housing through said open end.

17. The apparatus as defined in claim 15 wherein, upon disengagement of said deflectable tabs from said housing, a locking groove in said cavity of said removal tool engages a locking bump in said second portion of each of said deflectable tabs such that axial movement of said removal tool away from said housing pulls said seal retainer from inside said housing.

18. A method comprising the steps of:
   providing a rack operatively associated with steerable vehicle wheels, said rack being movable in opposite directions for turning the steerable wheels in opposite directions;
   locating a pinion in meshing engagement with said rack;
   providing a housing partially enclosing said rack and defining a fluid chamber, said housing having an internal recess;
   positioning a fluid seal between said tubular housing and said rack;
   positioning a seal retainer in said housing;
   engaging and axially supporting said fluid seal and encircling said rack with a first portion of said seal retainer;
   deflecting a second portion of said seal retainer radially inward as said seal retainer is positioned in said housing;
   snapping said second portion of said seal retainer radially outward into said internal recess in said housing to hold said seal retainer in said housing; and
   holding said fluid seal in sealing position between said tubular housing and said rack with said seal retainer.

19. The method as defined in claim 18 further comprising the steps of:
   providing an annular removal tool for removing said seal retainer from said housing;
   sliding said annular removal tool onto said rack and moving said annular removal tool axially toward said seal retainer until a first end portion of said annular removal tool contacts said second portion of said seal retainer inside said housing;
   deflecting said second portion of said seal retainer radially inward with continued axial movement of said annular removal tool such that said second portion disengages from said internal recess in said housing; and
   removing said seal retainer from said housing.

20. The method as defined in claim 19 further comprising the steps of:
   removing said seal retainer with fluid pressure in said housing, said fluid pressure pushing said seal retainer and said fluid seal out of said housing through said open end.

21. The method as defined in claim 20 further comprising the steps of:
   removing said seal retainer by providing a locking bump in said cavity of said removal tool which engages a locking groove in said second portion of each of said deflectable tabs;
   moving said removal tool axially away from said housing which pulls said seal retainer from inside said housing.

* * * * *